Aug. 16, 1960

C. E. MAGOUIRK ET AL 2,948,973

DITCH CLEARING ATTACHMENT FOR BULLDOZER BLADES

Filed July 10, 1956

INVENTORS
WILLIAM M. STONE,
CLARENCE E. MAGOUIRK,
BY

McMorrow, Berman & Davidson
ATTORNEYS.

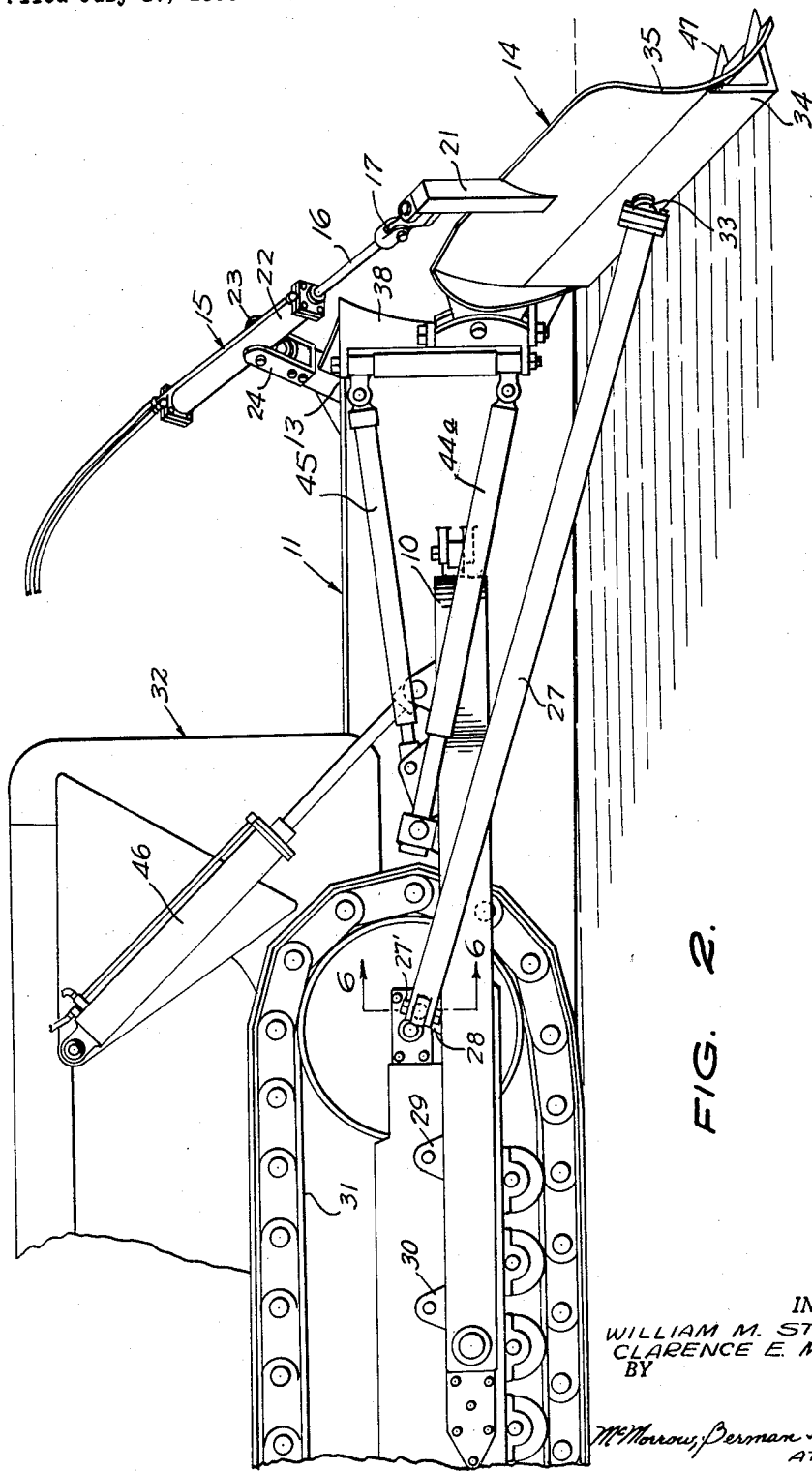

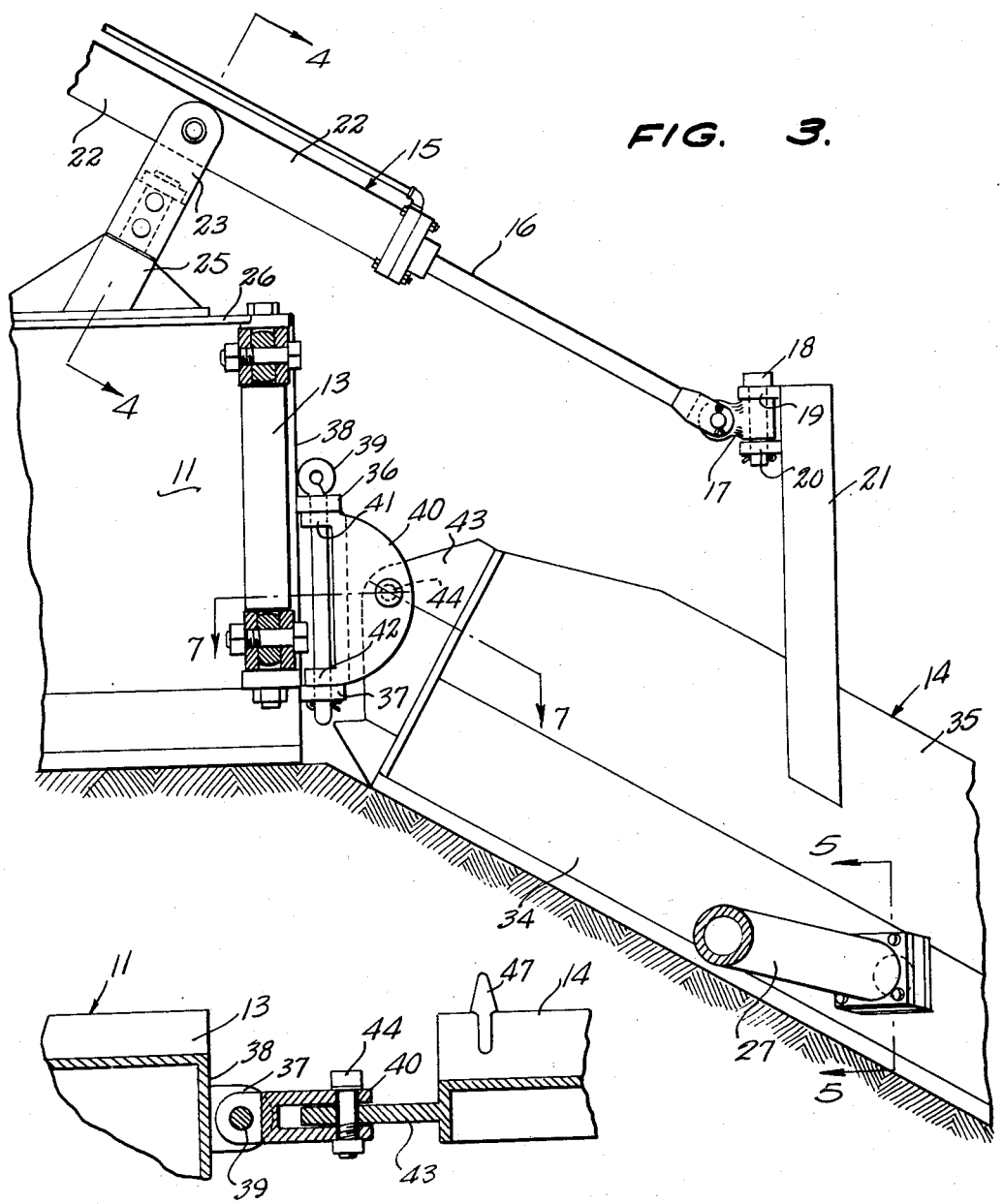

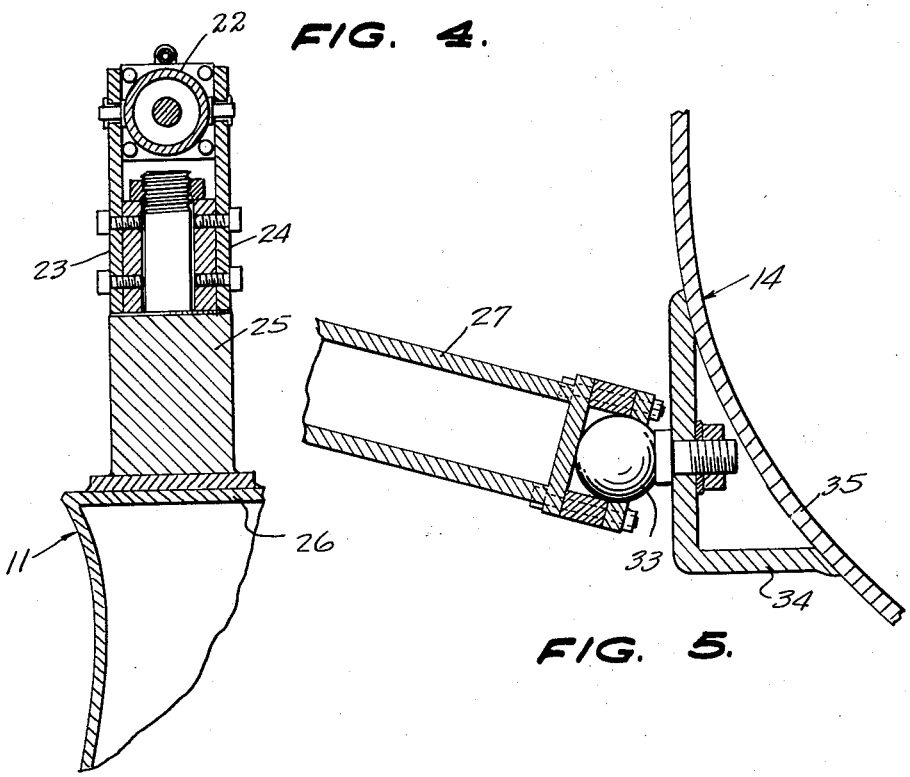
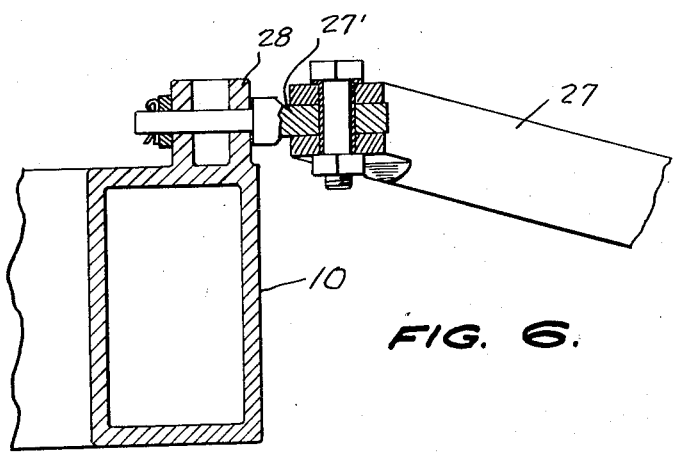

United States Patent Office 2,948,973
Patented Aug. 16, 1960

2,948,973

DITCH CLEARING ATTACHMENT FOR BULLDOZER BLADES

Clarence E. Magouirk and William Monroe Stone, both of P.O. Box 687, San Benito, Tex.

Filed July 10, 1956, Ser. No. 596,902

4 Claims. (Cl. 37—144)

The present invention relates to bulldozer blades and in particular to a blade for clearing the bank of a ditch and for attachment to a bulldozer.

An object of the present invention is to provide a ditch bank clearing blade for attachment to a bulldozer and one which can be used to effectively and efficiently clear the bank of a ditch simultaneously with the clearing and leveling of the ground adjacent the ditch bank.

Another object of the present invention is to provide a ditch bank clearing blade for attachment to a bulldozer which is sturdy in construction, one which is adjustable as to heighth and angle of the ditch bank, one which may be raised to an inoperative position when it is desired to use the bulldozer blade in other operations, one which is economical to manufacture and highly effective in action.

These and other objects and advantages of the present invention will be fully apparent from the following description when taken in connection with the annexed drawings, in which:

Figure 2 is a side elevational view of the assembly shown in Figure 1;

Figure 3 is a sectional view, on an enlarged scale, taken on the line 3—3 of Figure 1;

Figure 4 is a sectional view, on an enlarged scale, taken on the line 4—4 of Figure 3;

Figure 5 is a sectional view, on an enlarged scale, taken on the line 5—5 of Figure 3;

Figure 6 is a sectional view, on an enlarged scale, taken on the line 6—6 of Figure 2; and Figure 7 is a sectional view, on an enlarged scale, taken on the line 7—7 of Figure 3.

Figure 1:
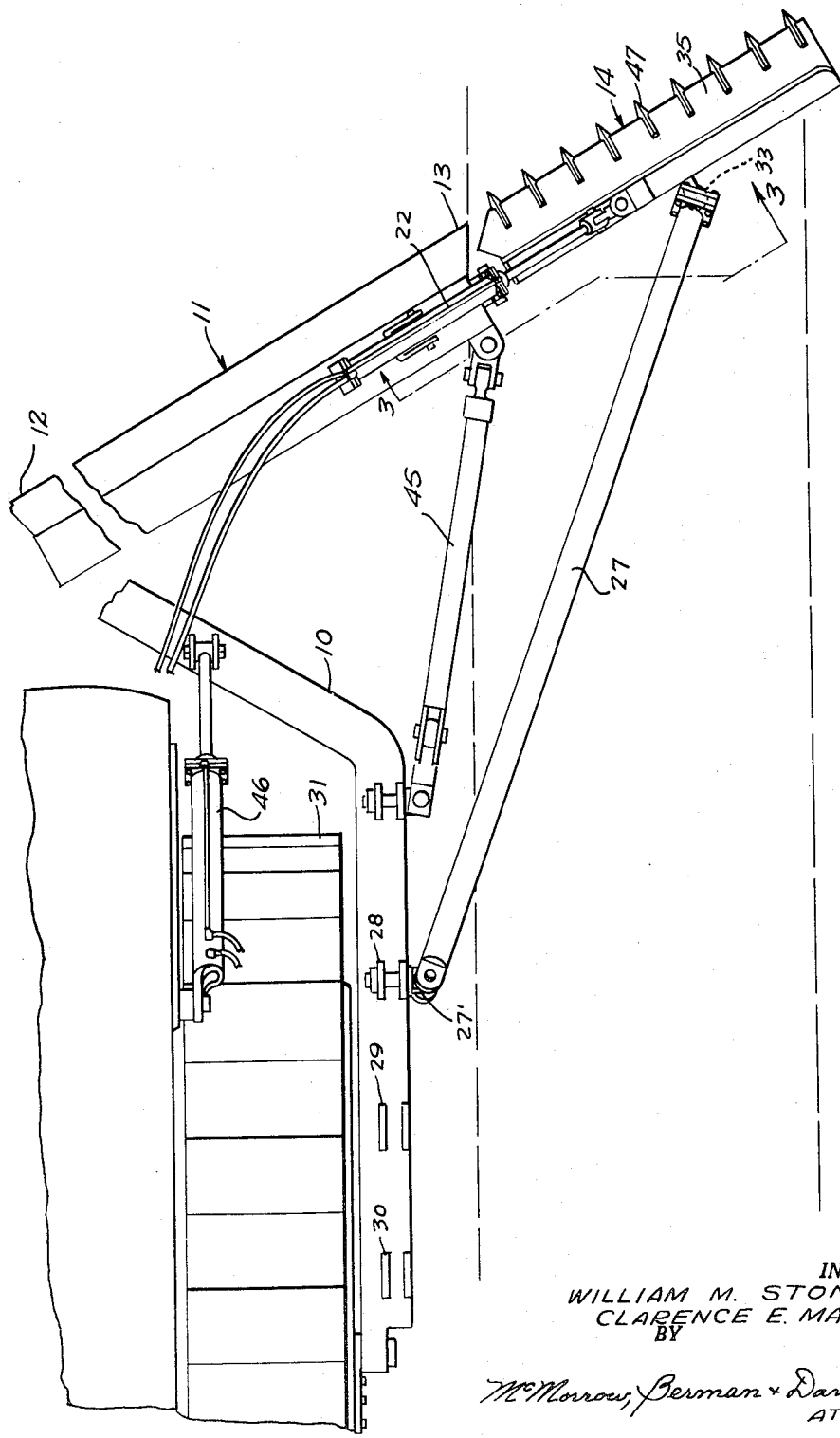
Figure 1 is a top plan view of a portion of the forward end of a bulldozer, showing the attachment of the present invention installed thereon.

Referring in greater detail to the drawings in which like numerals indicate like parts throughout the several views, the present invention consists in a ditch bank clearing attachment for a bulldozer having a mobile frame 10 to the forward end of which is fastened an upstanding dozer blade 11. The dozer blade 11 is positioned in front of and spaced from the forward end of the frame 10 so that it extends in a direction crosswise of the frame 10 with one of its ends 12 near the forward end of the frame 10 and the other of its ends 13 remote from the forward end of the frame 10. The dozer blade 11 is connected to the frame 10 for movement from the position in which the end 12 is near the forward end of the frame 10 to a position in which the end 12 is remote from the frame 10 and the end 13 is near the forward end of the frame 10.

The attachment of the present invention comprises a clearing blade 14 positioned to one side of the dozer blade 11 so that it is in longitudinal end to end alignment with the dozer blade 11 and is connected to the end 13 of the dozer blade 11 for swinging movement about a vertical axis from the longitudinal alignment position to a position forwardly of and at an angle with respect to the dozer blade 11 and also is connected to the dozer blade 11 for up and down movement about a horizontal axis with respect to the dozer blade 11.

Means is provided operatively connected to the clearing blade 14 for effecting the up and down movement of the clearing blade 14, and, specifically, this means consists in a hydraulic cylinder assembly 15 having its operating arm 16 connected by its free end to the universal coupling 17 pivotally connected by the bolt 18 to the projecting lugs 19 and 20 carried on the upper end of a post 21 which rises from the reverse side of the clearing blade 14. The cylinder 22 of the hydraulic cylinder assembly 15 is rockably supported between arms 23 and 24 which project upwardly in parallel spaced relation from a block 25 carried on the upper face of the reinforcing web 26 of the dozer blade 11.

Means is provided for securing the clearing blade 14 in any of its positions of movement about the vertical axis to the frame 10. Specifically, this means comprises a link bar 27 having one end pivotally connected by means of a universal joint coupler 27' to any one pair of three pairs of upwardly extending lugs 28, 29 and 30, which rise from the upper face of the frame 10 exteriorly of the endless track 31 of the bulldozer, the latter being indicated generally by the reference numeral 32. The other end of the positioning bar 27 is connected for universal movement to a ball 33 which projects rearwardly from the L-shaped reinforcing bar 34 intermediate the ends of the latter which extends longitudinally of and behind the arcuately curved plate 35 of the clearing blade 14.

The connection of one end of the clearing blade 14 to the end 13 of the bulldozer blade 11 consists in a pair of horizontally disposed outwardly extending spaced lugs 36 and 37 permanently fixed to the end plate 38 of the bulldozer blade 11 and having apertures for receiving a vertical pivot pin 39. A coupling member 40 having lugs 41 and 42 receiving the pin 39 forms the means for permitting the swinging movement about a vertical axis of the clearing blade 14 relative to the bulldozer blade 11. A vertically extending plate 43 projects from the adjacent end of the clearing blade 14 and is received between the ears of the coupling member 40, there being provided a horizontal pivot pin 44 constituting a horizontal axis and carried by the ears of the coupling member 40 and extending through the plate 43.

The position of the dozer blade 11 is adjusted by conventional means consisting in a pair of hydraulic cylinder assemblies 44a and 45 attached to the frame 10 at one end and to the lower end and upper end of the dozer blade 11, respectively, at their other ends. Another hydraulic cylinder assembly 46 raises and lowers the frame 10 carrying the dozer blade 11 and the clearing blade 14 upwardly and downwardly for positioning with respect to the desired ground and ditch bank level. Another pair of hydraulic cylinders are attached to the end 12 of the dozer blade 11 but are not shown in the drawings. The pairs of hydraulic cylinders at each end of the dozer blade 11 adjust the angle of the blade 11 with respect to the ground and also move it from its position in which the end 12 is near the bulldozer and the end 13 is remote from the bulldozer to the position in which the end 13 is adjacent the bulldozer and the end 12 is remote from the bulldozer. Obviously, this adjustment permits the angularity of the clearing blade 14 with respect to the bulldozer blade 11 to be adjusted as desired.

Pointed teeth 47 extend in spaced relation along the lower end of the plate 35 and project forwardly for routing and digging in the bank of the ditch to be cleared.

In use, the clearing blade 14 is positioned either in end to end alignment with respect to the dozer blade 11 or forwardly of it and at an angle to the horizontal for clearing the sides or banks of a ditch while the dozer blade 11 clears and scrapes the adjacent ground. The hydraulic cylinder assembly 15 permits the raising of the clearing blade 14 to a position out of contact with the ditch bank or ground when it is desired to use the dozer blade 11 in the conventional manner.

What is claimed is:

1. The combination with a mobile frame having a forward end, and an upstanding dozer blade positioned in front of and spaced from the forward end of said frame so that it extends in a direction crosswise of said frame with one of its ends near the forward end of said frame and the other of its ends remote from the forward end of said frame and connected to said frame for movement from the aforesaid position to a position in which said one end is remote from the forward end of said frame and said other end is near the forward end of said frame, of a ditch bank clearing attachment comprising a clearing blade positioned to one side of said dozer blade so that it is in longitudinal end to end alignment with said dozer blade, means connecting said clearing blade to said dozer blade for swinging movement from the longitudinal alignment position to a position forwardly of and at an angle with respect to dozer blade and for up and down movement with respect to said dozer blade, said means comprising a vertical pivot pin carried by the end of said dozer blade adjacent the end of said clearing blade, a coupling member connected to said pivot pin for swinging movement about said pin as an axis, a vertically extending plate carried by said adjacent end of said clearing blade, and a horizontal pivot pin carried by said coupling member and extending through said vertically extending plate.

2. The combination with a mobile frame having a forward end, and an upstanding dozer blade positioned in front of and spaced from the forward end of said frame so that it extends in a direction crosswise of said frame with one of its ends near the forward end of said frame and the other of its ends remote from the forward end of said frame and connected to said frame for movement from the aforesaid position to a position in which said one end is remote from the forward end of said frame and said other end is near the forward end of said frame, of a ditch bank clearing attachment comprising a clearing blade positioned to one side of said dozer blade so that it is in longitudinal end to end alignment with said dozer blade, means connecting said clearing blade to said dozer blade for swinging movement from the longitudinal alignment position to a position forwardly of and at an angle with respect to dozer blade and for up and down movement with respect to said dozer blade, said means comprising a vertical pivot pin carried by the end of said dozer blade adjacent the end of said clearing blade, a coupling member connected to said pivot pin for swinging movement about said pin as an axis, a vertically extending plate carried by said adjacent end of said clearing blade, and a horizontal pivot pin carried by said coupling member and extending through said vertically extending plate, and means operatively connected to said clearing blade for effecting the up and down movement of the latter.

3. The combination with a mobile frame having a forward end, and an upstanding dozer blade positioned in front of and spaced from the forward end of said frame so that it extends in a direction crosswise of said frame with one of its ends near the forward end of said frame and the other of its ends remote from the forward end of said frame and connected to said frame for movement from the aforesaid position to a position in which said one end is remote from the forward end of said frame and said other end is near the forward end of said frame, of a ditch bank clearing attachment comprising a clearing blade positioned to one side of said dozer blade so that it is in longitudinal end to end alignment with said dozer blade, means connecting said clearing blade to said dozer blade for swinging movement from the longitudinal alignment position to a position forwardly of and at an angle with respect to dozer blade and for up and down movement with respect to said dozer blade, said means comprising a vertical pivot pin carried by the end of said dozer blade adjacent the end of said clearing blade, a coupling member connected to said pivot pin for swinging movement about said pin as an axis, a vertically extending plate carried by said adjacent end of said clearing blade, and a horizontal pivot pin carried by said coupling member and extending through said vertically extending plate, and detachable means for securing said clearing blade in any of its positions of movement about said vertical axis to said frame.

4. The combination with a mobile frame having a forward end, and an upstanding dozer blade positioned in front of and spaced from the forward end of said frame so that it extends in a direction crosswise of said frame with one of its ends near the forward end of said frame and the other of its ends remote from the forward end of said frame and connected to said frame for movement from the aforesaid position to a position in which said one end is remote from the forward end of said frame, and said other end is near the forward end of said frame, of a ditch bank clearing attachment comprising a clearing blade positioned to one side of said dozer blade so that it is in longitudinal end to end alignment with said dozer blade, means connecting said clearing blade to said dozer blade for swinging movement from the longitudinal alignment position to a position forwardly of and at an angle with respect to dozer blade and for up and down movement with respect to said dozer blade, said means comprising a vertical pivot pin carried by the end of said dozer blade adjacent the end of said clearing blade, a coupling member connected to said pivot pin for swinging movement about said pin as an axis, a vertically extending plate carried by said adjacent end of said clearing blade, and a horizontal pivot pin carried by said coupling member and extending through said vertically extending plate, and detachable means for securing said clearing blade in any of its positions of movement about said vertical axis to said frame, said detachable means embodying a link bar having one end connected to said clearing blade for universal movement about a fixed axis carried by said clearing blade intermediate the ends thereof and having the other end pivotally connected to said frame.

References Cited in the file of this patent

UNITED STATES PATENTS

| | | |
|---|---|---|
| 1,466,464 | Beatty | Aug. 28, 1923 |
| 1,981,284 | Ray et al. | Nov. 20, 1934 |
| 1,993,282 | Porter | Mar. 5, 1935 |
| 2,241,666 | Hueter | May 31, 1941 |
| 2,312,255 | Lowdermilk | Feb. 23, 1943 |
| 2,387,764 | Maxwell | Oct. 30, 1945 |
| 2,640,286 | Briscoe | June 2, 1953 |
| 2,646,633 | Jahn | July 28, 1953 |
| 2,766,536 | Perkins | Oct. 16, 1956 |

FOREIGN PATENTS

| | | |
|---|---|---|
| 515,948 | Canada | Aug. 23, 1955 |